United States Patent
Rahman

(10) Patent No.: US 7,369,820 B2
(45) Date of Patent: May 6, 2008

(54) SYSTEM AND METHOD FOR DC OFFSET CORRECTION IN TRANSMIT BASEBAND

(75) Inventor: Mahibur Rahman, Lake Worth, FL (US)

(73) Assignee: Freescale Semiconductor, Inc., Austin, TX (US)

(*) Notice: Subject to any disclaimer, the term of this patent is extended or adjusted under 35 U.S.C. 154(b) by 520 days.

(21) Appl. No.: 11/096,520

(22) Filed: Apr. 1, 2005

(65) Prior Publication Data
US 2006/0223457 A1    Oct. 5, 2006

(51) Int. Cl.
*H04B 1/04* (2006.01)
(52) U.S. Cl. .................. 455/126; 455/91; 455/115; 375/297
(58) Field of Classification Search .............. 455/126, 455/91, 115, 116, 114, 102, 108, 109; 330/129, 330/136; 375/297
See application file for complete search history.

(56) References Cited

U.S. PATENT DOCUMENTS

| | | | |
|---|---|---|---|
| 5,584,059 A | 12/1996 | Turney | |
| 5,675,287 A | 10/1997 | Baker | |
| 6,356,217 B1* | 3/2002 | Tilley et al. | 341/118 |
| 6,385,238 B1* | 5/2002 | Nguyen | 375/232 |
| 6,434,204 B1 | 8/2002 | Amir | |
| 6,606,483 B1* | 8/2003 | Baker et al. | 455/126 |
| 6,853,941 B2* | 2/2005 | Wang et al. | 702/1.17 |
| 2002/0084842 A1* | 7/2002 | Yao et al. | 330/9 |
| 2003/0174783 A1* | 9/2003 | Rahman et al. | 375/298 |
| 2005/0020217 A1* | 1/2005 | Khoini-Poorfard | 455/115.1 |
| 2006/0105735 A1* | 5/2006 | Ibrahim et al. | 455/324 |
| 2006/0208779 A1* | 9/2006 | Lin et al. | 327/158 |

* cited by examiner

*Primary Examiner*—Matthew Anderson
*Assistant Examiner*—Minh Dao

(57) ABSTRACT

A radio frequency (RF) transceiver is provided. The RF transceiver comprises a transmit path comprising an output coupled to an RF antenna, a feedback path comprising an input coupled to the output of the transmit path, and a DC offset calibration module comprising a first input coupled to an output of the feedback path, a second input to receive a first signal and an output connected to an input of the transmit path. The DC offset calibration module is operable to determine a first direct current (DC) offset of a closed-loop path comprising the transmit path and the feedback path and determine a second DC offset based on the feedback path exclusive of the transmit path.

20 Claims, 4 Drawing Sheets

SYSTEM AND METHOD FOR DC OFFSET CORRECTION IN TRANSMIT BASEBAND

FIELD OF THE DISCLOSURE

The present disclosure is related generally to radio frequency (RF) transmissions and more specifically to correcting for DC offsets present in RF transmissions.

BACKGROUND

Direct current (DC) offsets in the transmit baseband path of a radio frequency (RF) transceiver can degrade the error vector magnitude (EVM) performance as well as the carrier suppression performance associated with a transmitted signal. These DC offsets typically are present as a result of circuit level mismatches and process-related variations in the transmit baseband signal paths. Such DC offsets may arise from, for example, digital-to-analog converters (DACs), gain amplifiers and baseband analog filters.

In light of the signal processing difficulties introduced by DC offsets, a number of techniques have been developed to reduce the DC offset in a transmitted signal. These conventional techniques typically employ considerable additional circuitry in the form of analog baseband correction loops, high-precision RF power detector, or RF demodulator to correct for DC offsets, thereby increasing the complexity and cost of implementing DC offset calibration in RF transceiving systems. Accordingly, an improved technique for DC offset correction would be advantageous.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

FIGS. 1-4 illustrate exemplary techniques for DC offset calibration in transmission systems. In at least one embodiment, an RF transceiver adjusts for DC offsets introduced by the transmit path of the RF transceiver by using a closed loop DC offset calibration that includes a feedback path whereby the feedback signal is used to determine the DC offset present in the feedforward path (i.e., the transmit path). However, because of DC offsets are typically inherent to the feedback path, the DC offsets present in the feedback signal include both the DC offsets contributed by the feedforward/transmit path as well as the DC offsets contributed by the feedback path. Accordingly, the portion of the overall DC offset of the closed-loop that is attributable to the feedback path is determined and a signal to be transmitted by the RF transceiver is adjusted based on the remaining DC offset component of the total closed-loop DC offset so as to compensate for the DC offset subsequently introduced by the feedforward path. In at least one embodiment, the feedback path utilizes a portion of a receive path of the RF transceiver. Moreover, in one embodiment, the amount of DC offset adjustment may be updated to compensate for changes in the transmit baseband gain setting without having to re-run the closed loop DC offset correction.

For ease of illustration the exemplary techniques disclosed herein are discussed in the context of quadrature transmit modulation systems such as quadrature amplitude modulation (QAM)-compliant systems, wideband code division multiple access (WCDMA)-compliant systems, high-speed downlink data packet access (HSDPA)-compliant systems and orthogonal frequency division multiplexing (OFDM)-compliant systems, and the like. Such systems may be implemented in, for example, third generation (3G), 3.5 generation (3.5G) and fourth generation (4G) cellular phones, IEEE 802.16-compliant devices, and the like. However, those skilled in the art may utilize the disclosed techniques in any of a variety of transmission systems using the guidelines provided herein without departing from the spirit or the scope of the present disclosure.

Figure 1:
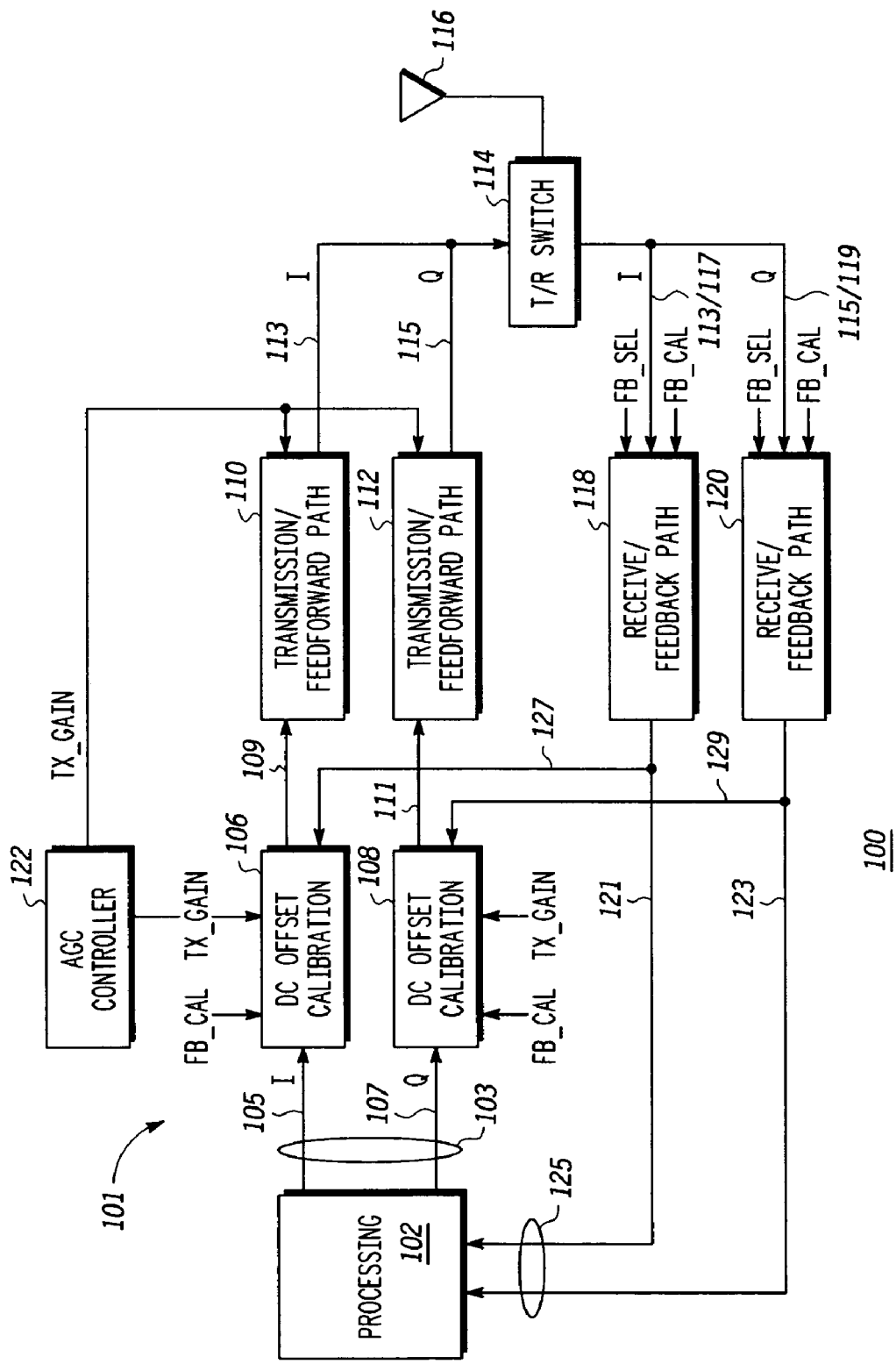
FIG. 1 is a block diagram illustrating an exemplary transmission system utilizing direct current (DC) offset calibration in accordance with at least one embodiment of the present disclosure.

Referring now to FIG. 1, an exemplary transmission system 100 implementing DC offset calibration is illustrated in accordance with at least one embodiment of the present disclosure. The transmission system 100 may represent, for example, a 3G or 4G cell phone operable to transmit and receive RF-based signals representative of audio content, video content, data and the like. In the illustrated example, the system 100 includes a data transmission portion 101 (e.g., an RF transceiver) and a processing portion 102. In at least one embodiment, the Data transmission portion 101 is used to transmit outgoing signals (referred to herein as transmit signals) representative of information provided by the processing portion 102 for use by another transmission system and further is used to receive incoming signals (referred to herein as receive signals) representative of information provided by another transmission system. Accordingly, the processing portion 102 may include one or more components used to process or otherwise manipulate information, such as, for example, a microprocessor, a microcontroller, and the like.

In the illustrated example, the data transmission portion 101 includes a transmit path and a receive path for imaginary components (I) of transmit/receive signals and a transmit path and a receive path for real components (Q) of the transmit/receive signals. Moreover, as noted above, a closed-loop DC offset calibration technique is employed whereby the transmit paths represent the feedforward paths of a closed loop and a portion of the receive paths can be used as the feedback paths of the closed loop.

The imaginary component (TX_I signal component 105) and real component (TX_Q signal component 107) of a transmit signal 103 are provided to DC offset calibration modules 106 and 108, respectively. The TX_I signal component 105 is adjusted or otherwise calibrated by the DC offset calibration module 106 to compensate for the DC offset introduced to the signal component 105 as it is processed by the transmit/feedforward path 110 for transmission as conditioned imaginary signal component 113 via a transmit/receive (T/R) switch 114 and RF antenna 116. Likewise, the TX_Q signal component 107 is adjusted or otherwise calibrated by the DC offset calibration module 108 to compensate for the DC offset introduced to the signal component 107 as it is processed by the transmit/feedforward path 112 for transmission as conditioned real signal component 115 via the T/R switch 114 and RF antenna 116.

Additionally, in at least one embodiment, the signal components 113 and 115 are fed back to the DC offset calibration modules 106 and 108, respectively, via receive/feedback paths 118 and 120, respectively. The feedback signal output by the receive/feedback path 118 is referred to herein as imaginary component feedback signal 127 and the feedback signal output by the receive/feedback path 120 is referred to herein as real component feed back signal 129. In a calibration mode (set using, for example, an FB_CAL signal provided to the paths 118 and 120 and the DC offset calibration modules 106 and 108), a calibration signal is provided to the inputs of the paths 118 and the resulting processed calibration signals are provided as feedback signals 127 and 129, respectively. Using the feedback/calibration signals 127 and 129, the DC offset calibration modules 106 and 108 may determine the DC offset introduced by the paths 118 and 120. In a closed-loop feedback mode (set using, for example, the FB_CAL signal), the overall DC offsets present in the feedback signals 127 and 129 are preadjusted to substantially remove the DC offsets attributable to the baseband paths located in 118 and 120 as determined in during the calibration mode so that the remaining DC offset in the adjusted feedback signals 127 and 129 are representative of the DC offsets attributable to the paths 110 and 112 (referred to the feedforward offsets). The DC offset calibration module 106 therefore may adjust the signal component 105 based on the feedforward DC offset attributed to the path 110 so as to at least partially compensate for the DC offset introduced to the resulting adjusted signal 109 as it is processed by the transmit/feedforward path 110. For example, assuming that it is determined that the DC offset introduced to the signal 109 by the transmit/feedforward path 110 introduces +10 millivolts (mV) of DC offset to the signal 109, the DC offset calibration module 106 may offset the signal component 105 by −10 mV so that the overall DC offset present in the signal component 113 output by the transmit/feedforward path 113 is at or near 0 V. In a similar manner, the DC offset calibration module 108 may adjust the signal component 107 based on the feedforward DC offset attributed to the path 112 so that the resulting signal 111 output by the DC offset calibration module 108 has a DC offset that compensates for a portion of the DC offset subsequently introduced to the signal 111 as it is processed for transmission by the transmit/feedforward path 112.

Due to various characteristics of the receive/feedback paths 118 and 120, such as circuitry mismatches and process-related variations, the receive/feedback paths 118 and 120 may introduce additional DC offsets to the feedback signals 127 and 129, respectively. Thus, the DC offsets present in the feedback signal 127 and 129 typically represent the total DC offsets introduced by the entire closed loop (i.e., both the feedforward path and the feedback path). However, the imaginary and real components (i.e., signal components 105 and 107) of the transmit signal 103 are only processed by the transmit/feedforward paths 110 and 112, respectively, in preparation for transmission. Thus, if the DC offset calibration modules 106 and 108 were to adjust the signal components 105 and 107 based on the overall DC offsets in the feedback signals 127 and 129, respectively, the resulting adjusted signals 109 and 111 may be over or under compensated. To illustrate, assume that the transmit/feedforward path 110 introduces a DC offset of +5 mV signal 109 (i.e., the resulting signal component 113 has a DC offset of +5 mV) and the receive/feedback path 118 introduces a +5 mV DC to the resulting signal component 113 (i.e., the resulting signal 127 has a total DC offset of +10 mV). If the DC offset compensation module adjusted the signal component 105 by −10 mV to compensate for the overall DC offset, the resulting signal component 113 would have an errant DC offset of −5 mV as the transmit/feedforward path would only add a DC offset of +5 mV (compared to the −10 mV adjustment by the DC offset calibration module 106). Accordingly, in at least one embodiment, the DC offset calibration modules 106 and 108 determine representative DC offsets in the feedback signals 127 and 129 attributable to the receive/feedback paths 118 and 120, respectively, during a calibration mode (e.g., at power up or during a training period). Upon entering a closed-loop DC calibration mode, the feedback signals 127 and 129 are adjusted to compensate for the portion of the overall DC offsets attributable to the receive/feedback paths 118 and 120. The signal components 105 and 107 then are adjusted based on remaining DC offsets present in the adjusted feedback signals so as to compensate for the DC offsets subsequently introduced by the transmit/feedforward paths 110 and 112.

In at least one embodiment, the receive/feedback paths 118 and 120 operate both as feedback paths for DC offset calibration of the transmit/feedforward paths 110 and 112 and as receive paths for signals received via the RF antenna 116. When configured as receive paths (based on, for example, a FB_SEL signal), the T/R switch 114 routes the imaginary signal component 117 of the receive signal to the receive/feedback path 118 and the real signal component 119 of the receive signal to the receive/feedback path 120. The resulting digital imaginary signal component 121 output by the path 118 and the digital real signal component 123 output by the path 120 (together representing a receive signal 125) are provided to the processing portion 102 for further processing. By using the paths 118 and 120 as both feedback paths and receive paths, the overall complexity, cost and power consumption of the transceiver 100 may be reduced.

The transmit/feedforward paths 110 and 112 may employ one or more gain stages for amplification of the transmit system. These gain stages typically are controlled by an AGC controller 122 that modifies the gain settings (TX_GAIN) in response to the characteristics of the transmit signals and the transmission environment. It will be appreciated that a gain in the gain settings of the gain stages of the paths 110 and 112 may alter the DC offsets introduced by the paths 110 and 112. Accordingly, as discussed in greater detail herein, the DC offset calibration modules 106 and 108 may dynamically adjust the DC offset correction applied to the signal components 105 and 107 in response to changes to the gain settings as signaled by the AGC controller 122.

Figure 2:
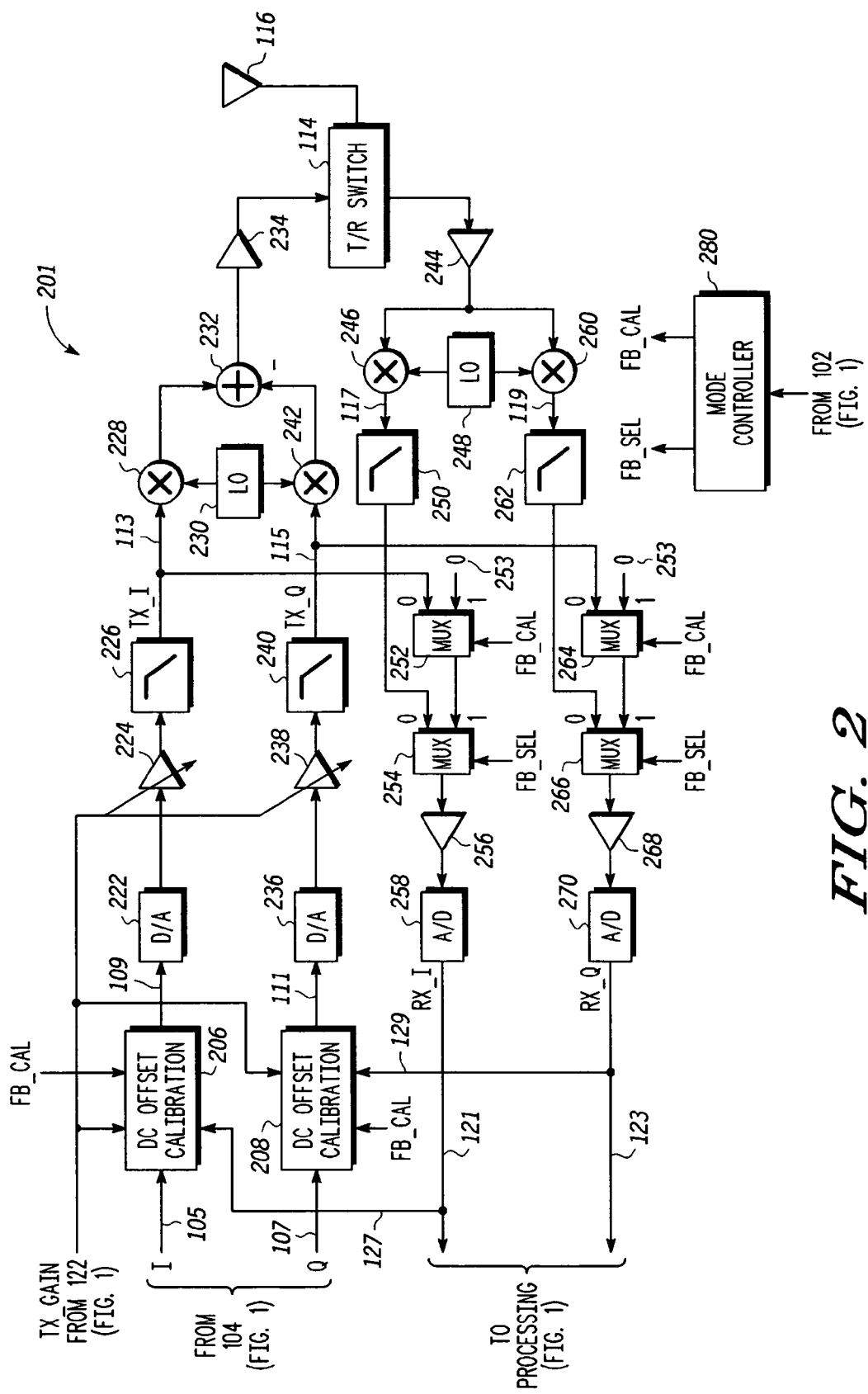
FIG. 2 is a block diagram illustrating an exemplary implementation of an RF tranceiver of the transmission system of FIG. 1 in accordance with at least one embodiment of the present disclosure.

Referring now to FIG. 2, an exemplary implementation of the Data transmission portion 101 of FIG. 1 as Data transmission portion 201 is illustrated in accordance with at least one embodiment of the present disclosure. For processing the imaginary component (TX_I signal component 105) of the transmit signal 103, the data transmission portion 201 implements a DC offset calibration module 206 (analogous to the DC offset calibration module 106, FIG. 1) and a transmit/feedforward path (e.g., transmit/feedforward path 110, FIG. 1) including a DAC 222, a gain stage 224 (e.g., an amplifier), an analog filter 226, a mixer 228, a local oscillator 230, a subtractor 232 and a power amplifier 234. For processing the real component (TX_Q signal component 107) of the transmit signal 103, the data transmission portion 201 implements a DC offset calibration module 208 (analogous to the DC offset calibration module 108, FIG. 1) and a transmit/feedforward path (e.g., transmit/feedforward path 112, FIG. 1) including a DAC 236, a gain stage 238, an analog filter 240, a mixer 242, the local oscillator 230, the subtractor 232 and the power amplifier 234.

For receiving signals, the data transmission portion 201 includes an imaginary component receive path (e.g., receive/feedback path 118, FIG. 1) including a low noise amplifier 244, a mixer 246, an analog filter 250, an input buffer 256 and an ADC 258. For the real component receive path (e.g., receive/feedback path 120, FIG. 1), the data transmission portion 201 includes the low noise amplifier 244, a mixer 260, the local oscillator 248, a filter 262, an input buffer 268 and an ADC 270.

In at least one embodiment the Data transmission portion 201 implements closed-loop DC offset calibration whereby the signal components 113 and 115 generated by the transmit paths are fed back to the DC offset calibration modules 206 and 208 as feedback signals 127 and 129, respectively. Based on the overall DC offsets of the feedback signals 127 and 129 and based on the components of the overall DC offset contributable to the receive/feedback paths, the DC calibration modules 206 and 208 may adjust the signal components 105 and 107, respectively, so as to compensate for the DC offsets introduced by the transmit/feedforward paths in processing the resulting adjusted signals 109 and 111, respectively.

As depicted by FIG. 2, the Data transmission portion 201 may utilize a portion of the receive paths of the data transmission portion 201 as the feedback paths used for the transmit signal components 113 and 115. The receive/feedback paths of the data transmission portion 201 may include multiplexers or other types of switches to enable the receive/feedback paths to operate in three modes: a receive mode to receive a wireless signal from another system; a calibration mode to determine the component of the overall DC offset of the feedback signal that is attributable to the feedback path; and a closed loop mode whereby the conditioned signal components output by the transmit/receive paths are fed back to the DC offset calibration modules 206 and 208. To illustrate, the imaginary receive/feedback path may include a multiplexer 252 having one input connected to the output of, for example, the filter 226 to receive the signal component 113 and another input connected to receive a calibration signal 253 (e.g., connected to ground so as to have a constant zero input), as discussed in greater detail below. The imaginary receive/feedback path further may include a multiplexer 254 having one input connected to the output of the multiplexer 252 and another input connected to, for example, the output of the filter 250 to receive the imaginary component 117 of a received signal. Similarly, the real receive/feedback path may include a multiplexer 264 having one input connected to the output of, for example, the filter 240 to receive the signal component 115 and another input connected to receive the calibration signal 253. The real receive/feedback path further may include a multiplexer 266 having one input connected to the output of the multiplexer 264 and another input connected to, for example, the output of the filter 262 to receive the real component 119 of the received signal.

Each of the multiplexers 252 and 264 includes a select input to receive an FB_CAL signal provided by, for example, a mode controller 280. Each of the multiplexers 254 and 266 includes a select input to receive an FB_SEL signal provided by, for example, the mode controller 280. The mode controller 280, in turn, may be controlled based on information provided from the processing portion 102 (FIG. 1).

Depending on the combination of values of the FB_CAL and FB_SEL signals, the receive/feedback paths may be configured to operate in three modes: a receive mode for processing receive signals; a feedback mode for feeding the signal components 113 and 115 back to the DC offset calibration modules 206 and 208, respectively; and a calibration mode for determining the DC offsets introduced by the feedback path. Table 1 describes the relation between the values for the FB_CAL and FB_SEL signals and the modes of operation with respect to the particular implementation illustrated by FIG. 2:

TABLE 1

| FB_SEL | FB_CAL | Mode |
| --- | --- | --- |
| 0 | X | Receive Signal Processing |
| 1 | 0 | Closed Loop Feedback |
| 1 | 1 | Calibration |

As Table 1 illustrates, the multiplexers 254 and 266 may be manipulated by the FB_SEL signal to select between the outputs of the filters 250 and 262, respectively, and the outputs of the multiplexers 252 and 264, respectively. Thus, the multiplexers 254 and 266 may be used to switch the receive/feedback paths of the data transmission portion 201 between a receive path or a feedback path. The multiplexers 252 and 264 may be manipulated by the FB_CAL signal to select between the signal components 113 and 115, respectively, or the calibration signal 253. Thus, the multiplexers 254 and 252 may be used to switch the receive/feedback paths of the data transmission portion 201 between a closed-loop feedback path or a calibration path.

As discussed in greater detail below, when the data transmission portion 201 is set to the calibration mode, the calibration signal 253 is processed by the receive/feedback paths and provided as signals 127 and 129 to the DC offset calibration modules 206 and 208, respectively. However, because the feedback signals 127 and 129 in this instance do not include DC offsets introduced by the transmit/feedback paths, the DC offsets present in the feedback signals 127 and 129 while in calibration mode may be attributable solely to the receive/feedback paths of the data transmission portion 201 and the DC offset calibration modules 206 and 208 therefore may determine the component of the overall DC offsets present in the feedback signals 127 and 129 while in closed-loop feedback mode based on the DC offsets present in the feedback signals 127 and 129 while in the calibration mode. Consequently, the remaining components of the overall DC offsets may be attributed to the transmit/receive paths and the DC offset calibration modules 206 and 208 may adjust the signal components 105 and 107, respectively, so as to compensate for the DC offsets subsequently introduced to the resulting adjusted signals 109 and 111 by the transmit/feedforward paths of the data transmission portion 201.

Figure 3:
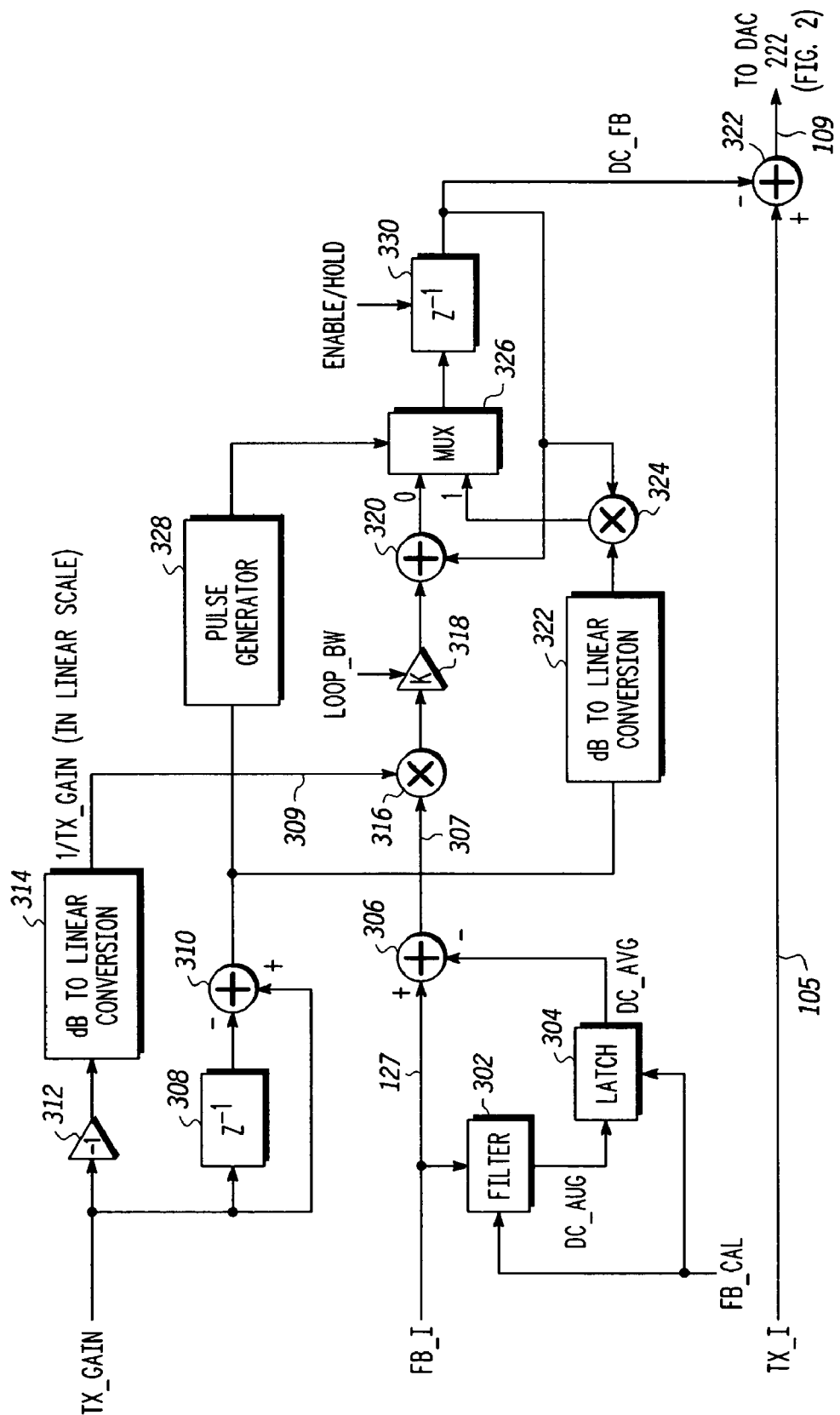
FIG. 3 is a block diagram illustrating an exemplary DC offset calibration module in accordance with at least one embodiment of the present disclosure.

Referring now to FIG. 3, an exemplary implementation of the DC offset calibration module 206 is illustrated in accordance with at least one embodiment of the present disclosure. It will be appreciated that the DC offset module 208 may be similarly configured for processing the real component of the transmit signal.

In the illustrated example, the DC offset calibration module 206 includes a low-pass filter 302 (i.e., a moving average filter) having an input to receive the imaginary feedback signal 127 and an enable input to receive the FB_CAL signal from, for example, the mode controller 280 (FIG. 2). The output of the filter 302 is connected to the input of a latch 304, which has a second input to receive the FB_CAL signal. When the FB_CAL signal is asserted to indicate that the data transmission portion 201 is in a calibration mode, the filter 302 calculates a moving average of the DC offset (DC_Avg) present in the feedback signal 127 for the imaginary component (FB_I). As discussed in greater detail herein, the feedback path that provides the feedback signal 127 may be supplied with a calibrating signal (e.g., a constant zero input provided at an input to the multiplexer 252, FIG. 2). In this instance, the DC offset present in the feedback signal is attributable to the feedback path and the average DC offset determined during the calibration mode represents the average DC offset introduced by the feedback path.

When the FB_CAL signal is deasserted, latch 304 latches the value representative of the average DC offset output by the filter 302 and provides the value to a first input of an subtractor 306. The second input of the subtractor 306 receives the feedback signal 127 and the output of the subtractor 306 provides a representation of the feedback signal 127 adjusted by the average DC offset calculated by the filter 302. It will be appreciated that the resulting calibrated signal 307 output by the subtractor 306 represents an adjustment to the feedback signal 127 to compensate for the DC offsets introduced by the feedback path.

The calibrated feedback signal 307 is provided to an input of a multiplier 316. Another input of the multiplier 316 receives a signal 309 representative of a scaling factor by which the calibrated signal 307 is to be scaled. In one embodiment, the signal 309 is inversely proportional to the transmission gain settings (TX_GAIN) of the gain stage 224 (FIG. 1) so as to pre-compensate for the signal scaling to be provided by the gain stage 224. Thus, the multiplier 316 maintains a substantially constant loop bandwidth even after the gain state of the analog gain stage 224 is altered. The output of the multiplier 316 may be provided to an open loop gain stage 318. The open loop gain stage 318 scales the input by a programmed value (LOOP_BW) to set the loop bandwidth. Thus, the open loop gain stage 318 may control the loop dynamics. An accumulator, comprising a subtractor 320 and an accumulator register 330, is connected to the output of the gain stage 318. The accumulator functions as a low pass filter to measure the DC offset of the compensated input signal.

The accumulator further may implement a technique for dynamically compensating for DC offset changes caused by altering the state of the analog baseband gain control stage 224 (FIG. 2) The TX_GAIN signal specifies the state of the analog baseband gain control stage 224. When ever the baseband gain control state is altered by an AGC system, the unit delay block 308, in conjunction with the subtractor 310, determines the change in gain (in decibels) at the output of the subtractor 310. The change in state at the output of the subtractor 310 causes the pulse generator unit 328 to generate a pulse at the control input of the multiplexor 326. This pulse causes the accumulator register 330 to be dynamically loaded by a scaled version of its current content depending upon the amount of gain change computed at the output of the subtractor 310 (in decibels). The indicated scaling value may be determined as follows. The amount of gain change (in decibels) at the output of the subtractor 310 is converted to a linear scale using the "dB to linear conversion" block 322 and then multiplied by the output of the accumulator register 330 before feeding the result back into this same register through the multiplexor 326 when a pulse is generated by the pulse generator unit 328. This dynamic compensation of the accumulator register causes immediate compensation of the DC offset change introduced by changing the state of the analog gain control stage 224, thereby eliminating the need to re-run a closed loop DC correction. The dynamic compensation scheme using the multiplier 324 and the multiplexor 326 typically is used when the DC offsets due to the D/A converter 222 are known or are estimated to be relatively insignificant with respect to its noise floor. This can be achieved by improving the circuit level matching in the D/A converter.

The output of the accumulator register 330 represents the DC offset detected in the signal 307 attributable to the transmit path of the data transmission portion 201 (DC_FB). Accordingly, the output of the accumulator register 330 is provided to one input of a subtractor 332 and another input of the subtractor 332 receives the TX_I signal component 105. The output of the subtractor 332 is provided as adjusted signal 109 to the DAC 222 (FIG. 2) for conversion from a digital form to an analog form. It will be appreciated that the output of the subtractor 332 as the adjusted signal 109 represents the TX_I signal component 105 adjusted to compensate for the DC offset introduced by the transmit path used to provide a representation of the TX_I signal component 105 for transmission. Moreover, by using the filter 302, the latch 304 and the subtractor 306, the DC offset introduced by the feedback path of the closed loop may be reduced or eliminated from the feedback signal 127, thereby allowing a more accurate calculation of the DC offset attributable to the transmit path and thereby allowing a more accurate DC offset compensation to be applied to a transmit signal. Dynamic scaling performed at the multiplier 316 ensures that a constant loop bandwidth may be maintained even after the gain state of the analog gain control stage 224 is altered. In addition, the multiplier 324 in conjunction to the multiplexor immediately compensates for DC offset changes caused by altering the gain state of analog gain control stage 224 without having to re-run closed loop DC correction.

Figure 4:
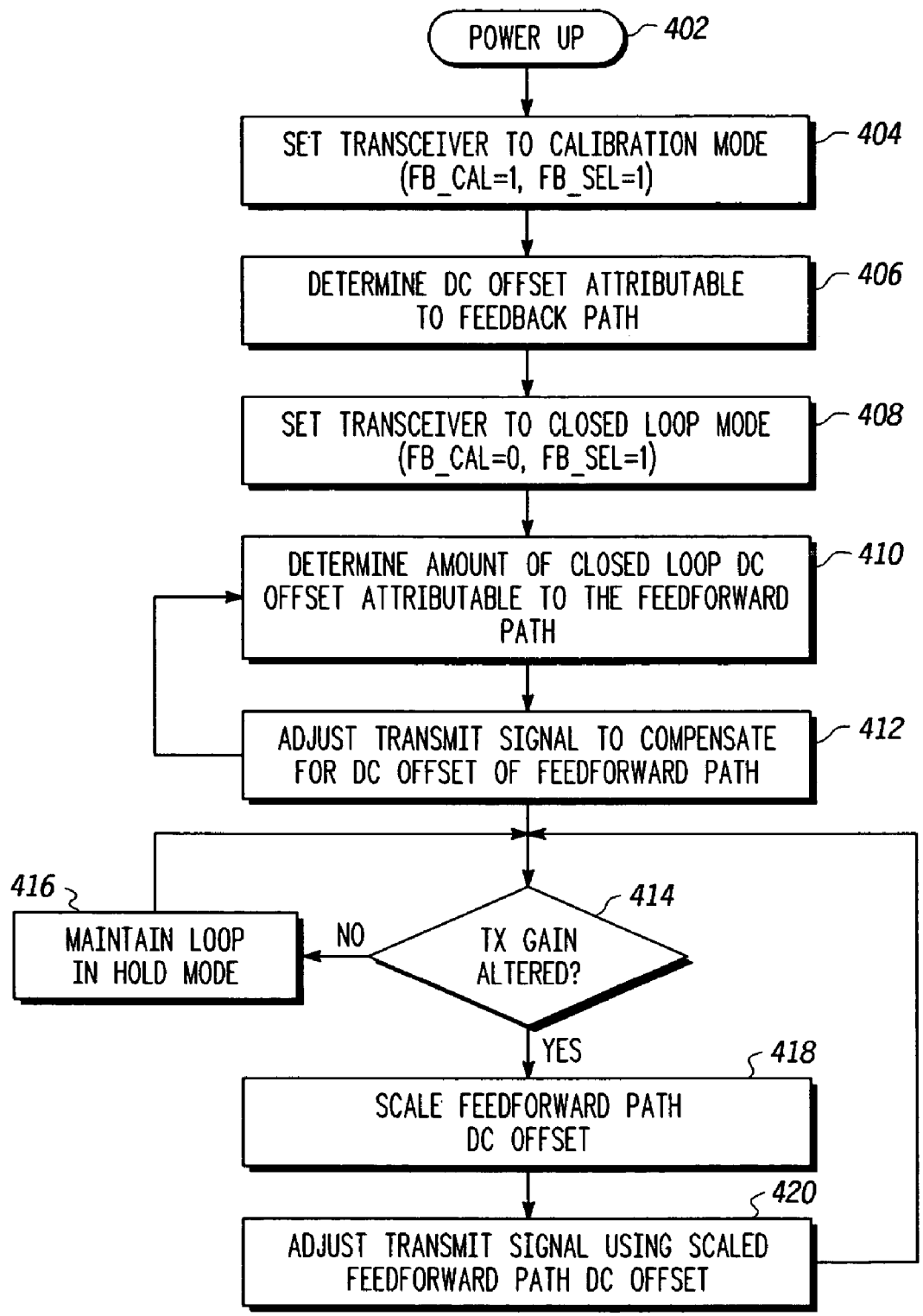
FIG. 4 is a flow diagram illustrating an exemplary method for DC offset calibration in accordance with at least one embodiment of the present disclosure.

Referring now to FIG. 4, an exemplary method 400 for compensating for DC offsets is illustrated in accordance with at least one embodiment of the present disclosure. As with FIG. 3, method 400 is discussed in the context of processing the imaginary component of a transmit signal and the same principles may be similarly applied for the processing of the real component of the transmit signal.

The method 400 initiates at step 402 wherein the Data transmission portion 201 enters a power-up or training state. At step 404 the data transmission portion 201 is set to calibration mode. Referring to the implementations of FIGS. 2 and 3, the processing portion 102 (FIG. 1) may provide a signal to the mode controller 280 indicating that a calibration mode is to be entered. In response, the mode controller 280 may assert the FB_CAL signal (e.g., FB_CAL=1) and assert the FB_SEL signal (e.g., FB_SEL=1) so that a calibration signal 253 (e.g., a constant zero input) received at an input to the multiplexer 252 is propagated through the multiplexer 244, the input buffer 256, the ADC 258 and the resulting feedback signal 127 provided to the DC offset calibration module 206. At step 406 a representation of the DC offset attributable to the feedback path is determined. As noted above with reference to the filter 302 of FIG. 3, the DC offset attributable to the feedback path may be calculated as a moving average over a portion of the calibration period.

At step 408 the data transmission portion 201 is set to closed-loop DC offset calibration mode. Referring to the implementations of FIGS. 2 and 3, the processing portion 102 may provide a signal to the mode controller 280 indicating that the closed-loop DC offset calibration mode is to be entered. In response, the mode controller 280 may deassert the FB_CAL signal (e.g., FB_CAL=0) and assert the FB_SEL signal (e.g., FB_SEL=1) so that the transmit signal component 113 output by the transmit/feedforward path is fed back through the multiplexers 252 and 254, the input buffer 256, and the ADC 258, resulting in feedback signal 127.

At step 410 the amount of the total closed-loop DC offset attributable to the transmit/feedforward path is determined. As illustrated by the implementation of the DC offset compensation module 206 of FIG. 3, the DC offset attributable to the transmit/feedforward path may be determined by removing or subtracting the average DC offset attributable to the feedback path (as determined at step 406) from the feedback signal component 107, whereby any remaining DC offset in the resulting adjusted signal 307 may be attributed to the feedforward path.

At step 414 it is determined whether the transmission gain of the transmit/feedforward path has changed. If no change has occurred, the loop is maintained in a hold state whereby the transmit signal component 105 is adjusted based on the current DC offset value stored at the accumulator register 330 (this DC offset value representing the DC offset attributed to the transmit/receive path) so as to precompensate for this DC offset as the resulting adjusted signal 109 is processed by the transmit/feedforward path in preparation for transmission.

If a change in the gain has occurred, the DC offset attributable to the transmit/feedforward path is scaled based on the transmit path gain at step 418. In at least one embodiment, the feedforward path DC offset is scaled in inverse proportion to the gain as illustrated by FIG. 3. A value representative of the scaled feedforward path DC offset is provided to accumulator register 330 and the accumulator register is enabled (e.g., by providing an enable signal for a clock cycle) so as to store the value. At step 420, the accumulator register 330 is placed in a hold state and the transmit signal component 105 is adjusted based on the scaled DC offset value stored at the accumulator register 330.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   determining a first direct current (DC) offset of a first closed-loop path of a radio frequency (RF) transceiver, wherein the first closed-loop path comprises a first path and a second path, the first path comprising a portion of a first transmit path of the RF transceiver and the second path comprising a portion of a first feedback path having an input coupled to an output of the first transmit path; and
   determining a second DC offset based on the second path exclusive of the first path.

2. The method of claim 1, further comprising:
   adjusting a first signal based on a third DC offset representative of a difference between the first and second DC offsets to generate a first adjusted signal; and
   providing the first adjusted signal to an input of the first transmit path.

3. The method of claim 2, wherein the third DC offset represents an averaged difference between the first and second DC offsets.

4. The method of claim 1, further comprising:
   scaling a third DC offset representative of a difference between the first and second DC offsets based on a gain of a gain stage of the first transmit path;
   adjusting a first signal based on the scaled third DC offset to generate a first adjusted signal; and
   providing the first adjusted signal to an input of the first transmit path.

5. The method of claim 4, further comprising:
   averaging the third DC offset; and
   wherein the first signal is adjusted based on the averaged third DC offset.

6. The method of claim 4, wherein the third DC offset is scaled inversely proportional to the gain of the gain stage.

7. The method of claim 1, wherein determining the second DC offset comprises:
   providing a calibration signal to an input of the first feedback path; and
   wherein the second DC offset is based on a DC offset of a signal output by the first feedback path in response to the provision of the calibration signal.

8. The method of claim 7, wherein the second DC offset is based on a moving average of the DC offset of the signal output by the first feedback path.

9. The method of claim 1, wherein the first feedback path comprises a portion of a receive path of the RF transceiver.

10. The method of claim 1, further comprising:
    determining a third DC offset of a second closed-loop path of the RF transceiver, wherein the second closed-loop path comprises a third path and a fourth path, the third path comprising a portion of a second transmit path of the RF transceiver and the fourth path comprising a portion of a second feedback path having an input coupled to an output of the second transmit path; and
    determining a fourth DC offset based on the fourth path exclusive of the third path;
    wherein the first transmit path is associated with a real component of a received signal and the second transmit path is associated with an imaginary component of the received signal.

11. A method for calibrating a transmit path of a RF transceiver, the method comprising:
    when in a first mode:
       providing a calibration signal to a feedback path of a closed loop comprising a transmit path and the feedback path;
       determining a first DC offset associated with the feedback path based on a first feedback signal output by the feedback path in response to the provision of the first calibration signal;
    when in a second mode:
       providing a second signal to the closed loop, wherein the feedback path outputs a second feedback signal in response to the provision of the second signal;
       determining a second DC offset associated with the second feedback signal;
       determining a third DC offset associated with the transmit path based on the first and second DC offsets; and
       adjusting the second signal based on the third DC offset.

12. The method of claim 11, wherein determining the first DC offset comprises determining an average DC offset of the first feedback signal and wherein the first DC offset comprises the average DC offset.

13. The method of claim 11, wherein the third DC offset is substantially equal to a difference between the second DC offset and the first DC offset.

14. The method of claim 11, wherein the third DC offset is substantially equal to an averaged difference between the second DC offset and the first DC offset.

15. The method of claim 14, further comprising:
scaling the third DC offset based on a gain of a gain stage of the transmit path; and
wherein the second signal is adjusted based on the scaled third DC offset.

16. The method of claim 11, further comprising:
scaling the third DC offset based on a gain of a gain stage of the transmit path;
averaging the scaled third DC offset; and
wherein the second signal is adjusted based on the averaged scaled third DC offset.

17. The method of claim 11, wherein the feedback path comprises a portion of a receive path of the RF transceiver.

18. A radio frequency (RF) transceiver comprising:
a transmit path comprising an output coupled to an RF antenna;
a feedback path comprising an input coupled to the output of the transmit path; and
a DC offset calibration module comprising a first input coupled to an output of the feedback path, a second input to receive a first signal and an output connected to an input of the transmit path, wherein the DC offset calibration module is operable to:
determine a first direct current (DC) offset of a closed-loop path comprising the transmit path and the feedback path; and
determine a second DC offset based on the feedback path exclusive of the transmit path.

19. The RF transceiver of claim 18, wherein the DC offset calibration module is further operable to:
adjust a first signal based on a third DC offset representative of a difference between the first and second DC offsets to generate a first adjusted signal; and
provide the first adjusted signal to an input of the first transmit path.

20. The RF transceiver of claim 18, wherein the DC offset calibration module is further operable to:
scale a third DC offset representative of a difference between the first and second DC offsets based on a gain of a gain stage of the first transmit path;
adjust a first signal based on the scaled third DC offset to generate a first adjusted signal; and
provide the first adjusted signal to an input of the first transmit path.

* * * * *